United States Patent
Conover

(10) Patent No.: US 7,975,260 B1
(45) Date of Patent: Jul. 5, 2011

(54) METHOD OF DIRECT ACCESS AND MANIPULATION OF DEBUGGEE MEMORY FROM DEBUGGER

(75) Inventor: Matthew Conover, East Palo Alto, CA (US)

(73) Assignee: Symantec Corporation, Mountain View, CA (US)

(*) Notice: Subject to any disclaimer, the term of this patent is extended or adjusted under 35 U.S.C. 154(b) by 1414 days.

(21) Appl. No.: 11/341,048

(22) Filed: Jan. 27, 2006

(51) Int. Cl.
*G06F 9/44* (2006.01)
*G06F 13/00* (2006.01)

(52) U.S. Cl. ............ 717/127; 717/124; 711/153; 726/22

(58) Field of Classification Search .................. 717/124, 717/127; 711/153
See application file for complete search history.

(56) References Cited

U.S. PATENT DOCUMENTS

| | | | |
|---|---|---|---|
| 5,611,043 A * | 3/1997 | Even et al. | 714/38 |
| 5,974,549 A * | 10/1999 | Golan | 714/47 |
| 6,618,851 B1 * | 9/2003 | Zundel et al. | 711/156 |
| 7,293,251 B2 * | 11/2007 | Zeman et al. | 717/124 |
| 7,356,736 B2 * | 4/2008 | Natvig | 726/25 |
| 7,430,670 B1 * | 9/2008 | Horning et al. | 713/190 |
| 2004/0221271 A1 * | 11/2004 | Zeman et al. | 717/127 |
| 2008/0235481 A1 * | 9/2008 | Baddepudi et al. | 711/171 |

OTHER PUBLICATIONS

Zandy, Victor C, Barton P Miller, and Miron Livny. "Process Hijacking" Aug. 1999. Eighth IEEE International Symposium on High Performance Distributed Computing. pp. 177-184. Downloaded on Dec. 10, 2009 from IEEE Xplore.*

* cited by examiner

*Primary Examiner* — Michael J Yigdall
*Assistant Examiner* — Erika Kretzmer
(74) *Attorney, Agent, or Firm* — Gunnison, McKay & Hodgson, L.L.P.; Philip McKay

(57) ABSTRACT

A method includes generating a list of shared and private memory regions of a debuggee. A thread is injected into the debuggee for generating the list and communicating with the debugger. Associated shared memory region handles are added to the list. The handles are used to map the shared memory regions of the debuggee to a debugger. New shared memory regions corresponding to the private memory regions of the debuggee are created and mapped to the debugger. Handles for the new shared memory regions are provided to map the new shared memory regions to the debuggee. The debuggee private memory regions are freed. The new shared memory regions are mapped to respective virtual addresses of the debuggee corresponding to the respective freed private memory regions. In this manner, content of debuggee memory regions is directly accessible by the debugger, and computer processing resources are conserved.

18 Claims, 10 Drawing Sheets

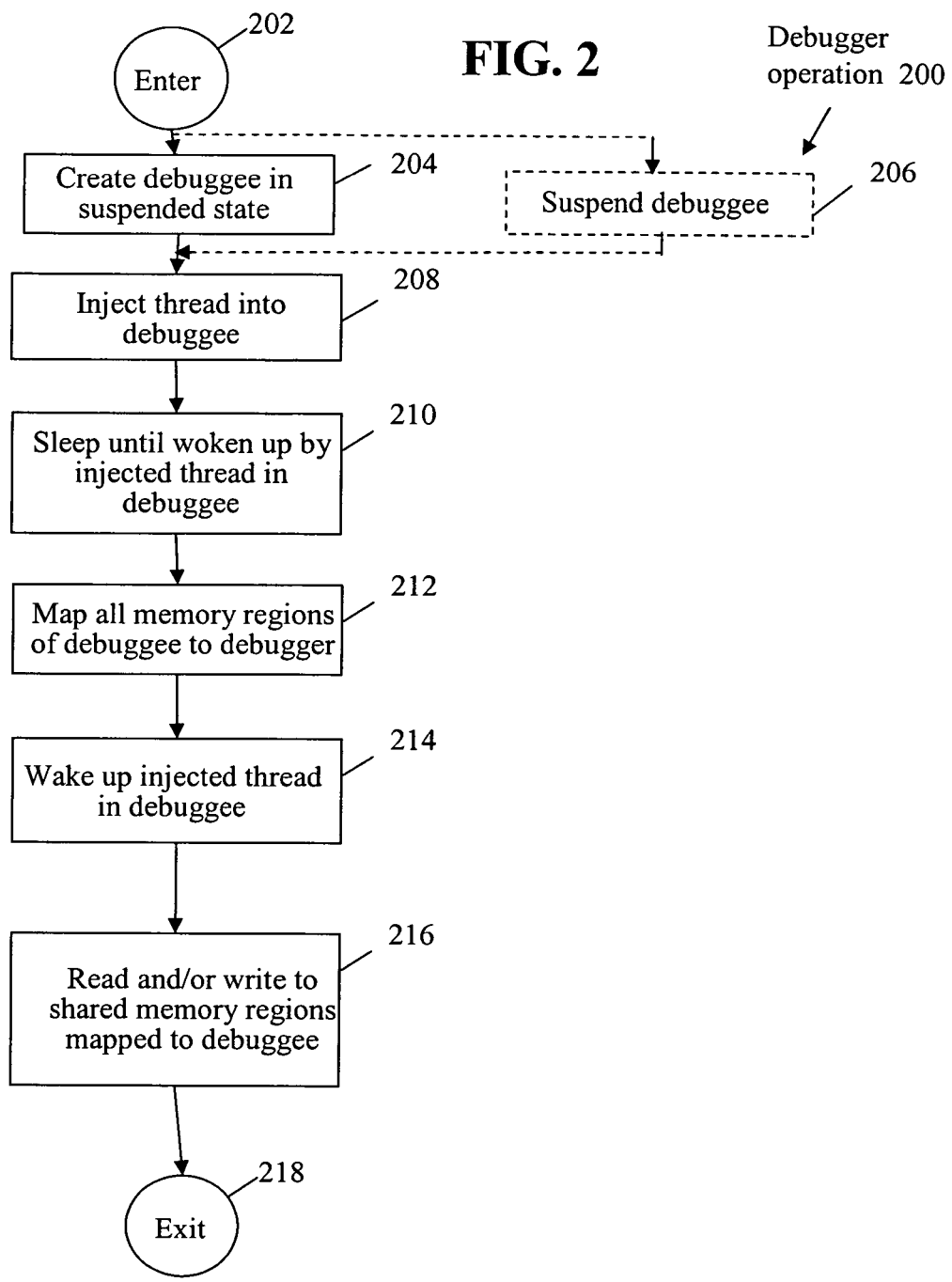

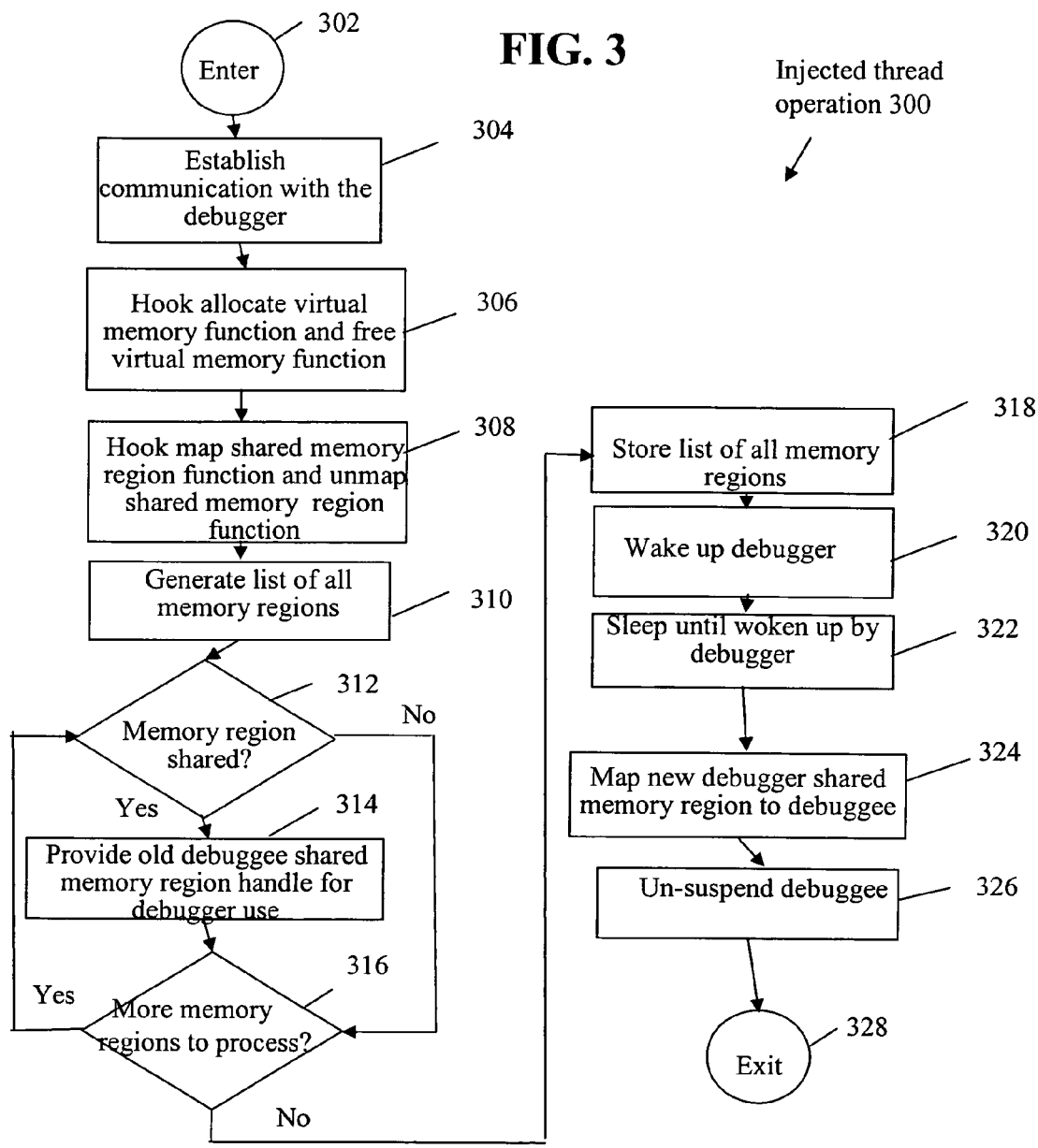

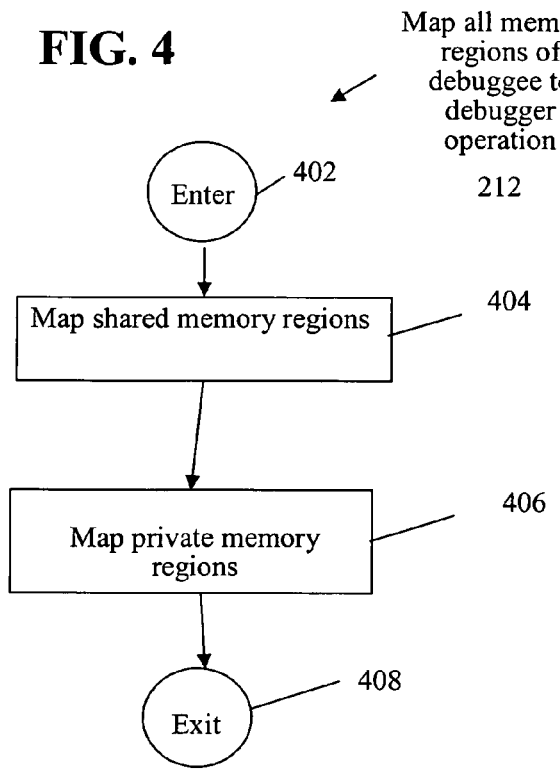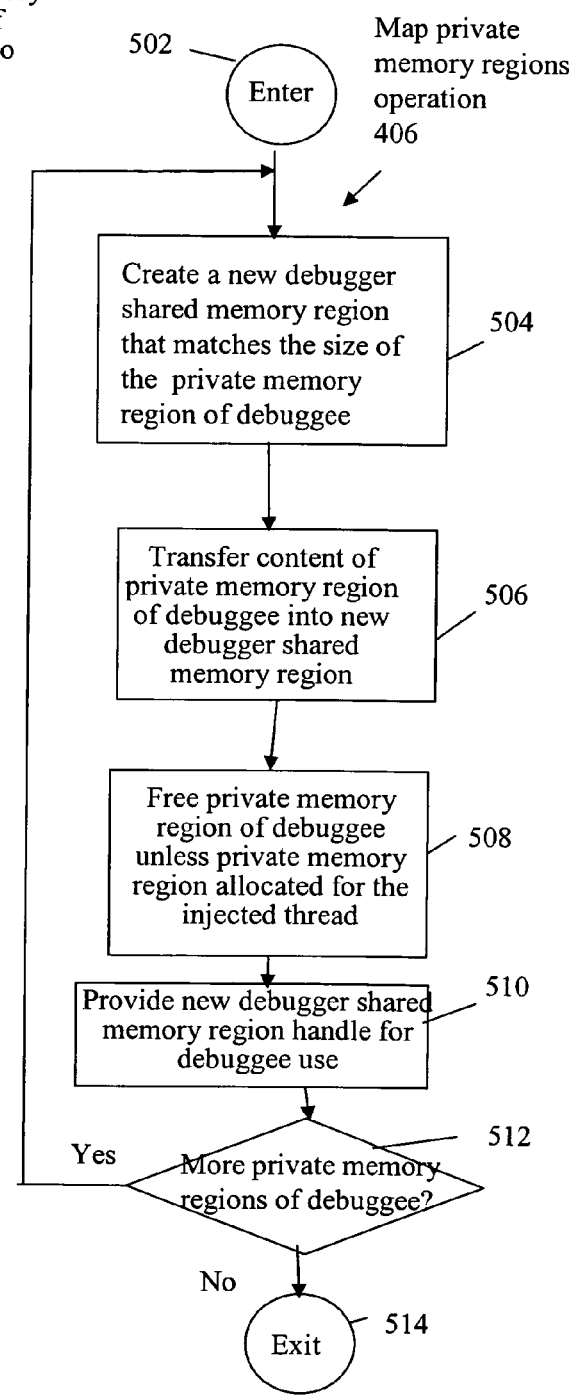

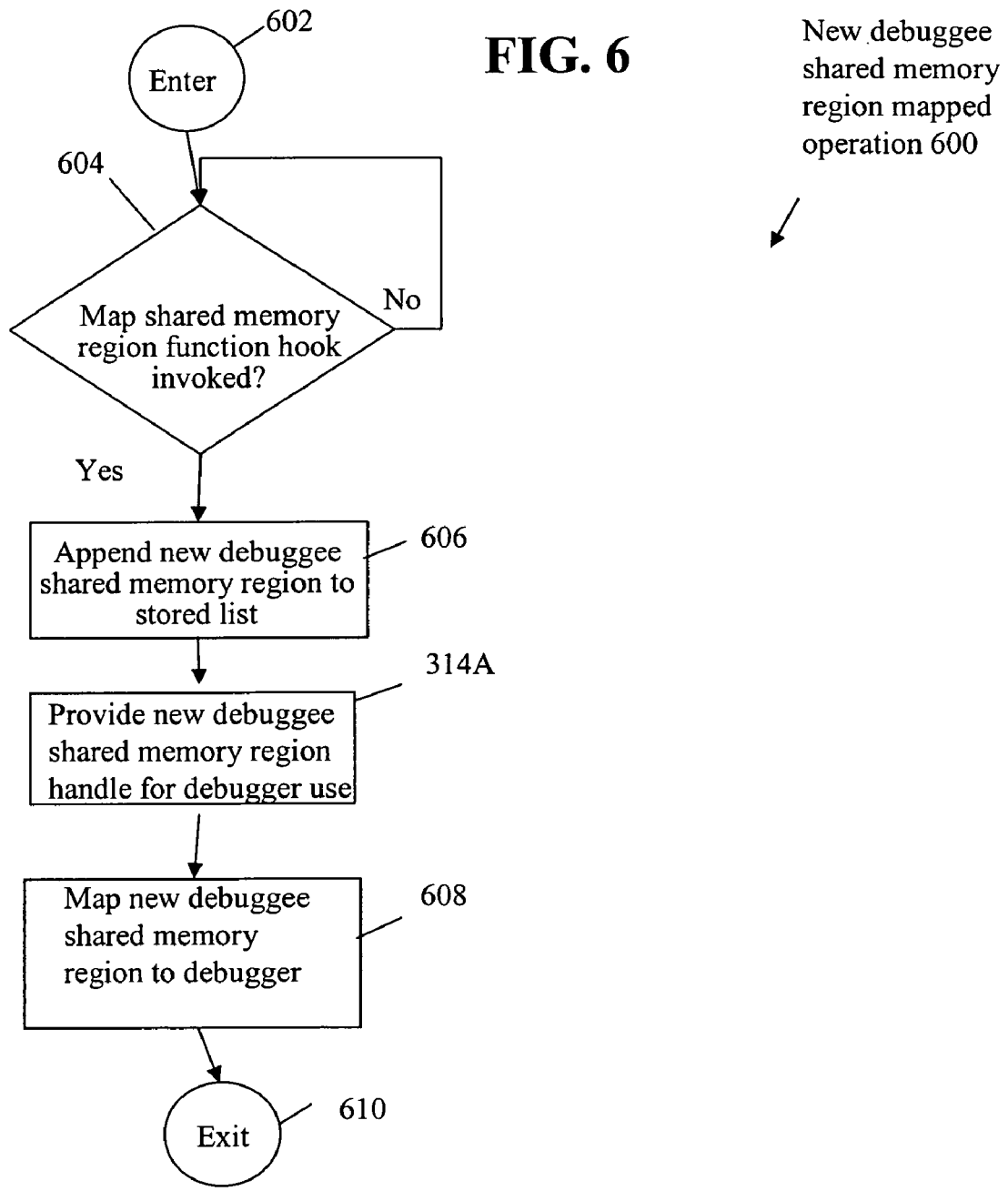

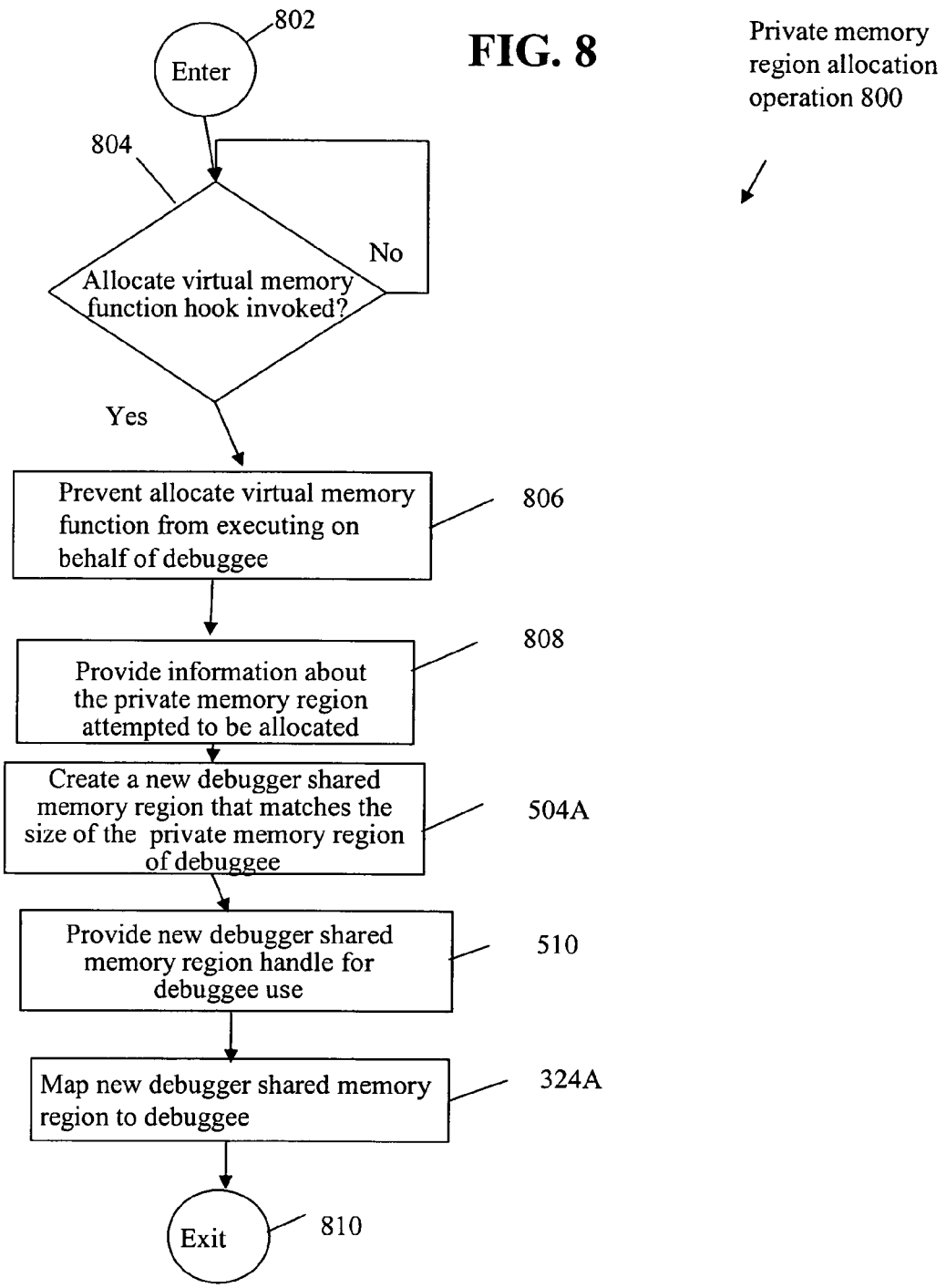

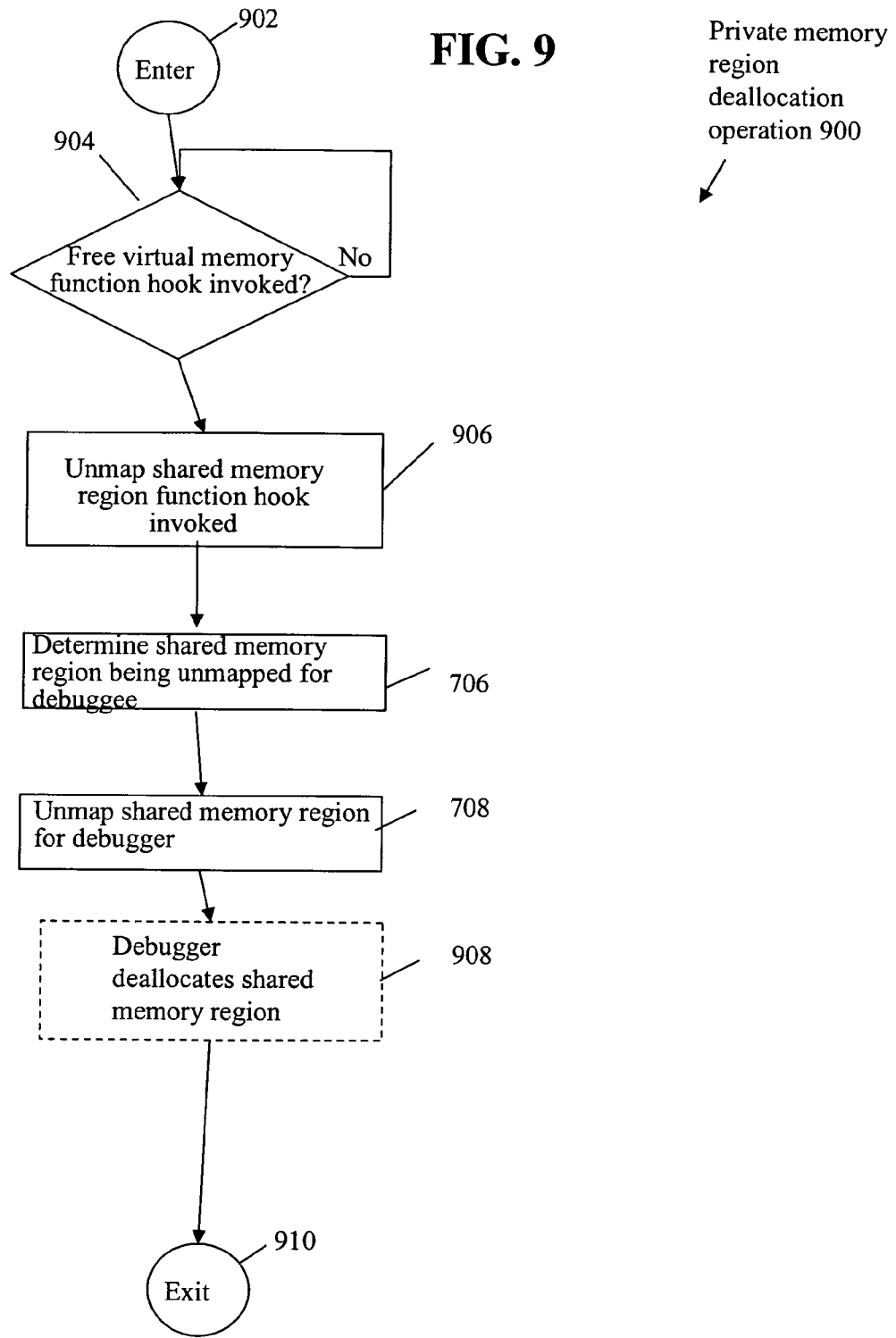

METHOD OF DIRECT ACCESS AND MANIPULATION OF DEBUGGEE MEMORY FROM DEBUGGER

BACKGROUND

1. Field of the Invention

The present invention relates to computer system resource management. More particularly, the present invention relates to a system and method of accessing and manipulating memory regions.

2. Description of the Related Art

Computer systems are often subject to invasive or malicious software. To combat such invasions, software is often analyzed, i.e., assessed, to determine its trustworthiness and to identify malicious code elements in the software.

Such a software assessment method, however, is computationally intensive. To illustrate, a packed executable is run in an isolated process, e.g., a debuggee, on a computer system. A debugger or code emulator on the computer system analyzes the execution and the results of the execution. Each time the debugger needs to access the memory of the debuggee, the debugger makes a call to an operating system function such as a read process memory function or a write process memory function. Each system call results in a context switch from user mode to kernel mode to accomplish the memory access. Completion of each access operation results in another context switch from kernel mode to user mode, to permit continuation of execution of the debugger. Excessive context switches incur overhead costs and degrade computer performance.

The foregoing costs and inefficiencies associated with traditional methods of analyzing software render such methods unviable in a real time computer system environment.

SUMMARY OF THE INVENTION

In accordance with one embodiment of the present invention, a method includes generating a list of all memory regions of a first process, hereinafter a debuggee. The memory regions include shared memory regions and private memory regions. Shared memory region handles for the shared memory regions are added to the list. The shared memory region handles are used to map the shared memory regions to a second process, hereinafter, a debugger. New shared memory regions corresponding to the private memory regions of the debuggee are created and mapped to the debugger. Content of the private memory regions is transferred to the new shared memory regions. Shared memory region handles for the new shared memory regions are used to map the new shared memory regions to the debuggee.

Provision of the new shared memory regions and mapping of all shared memory regions to both the debugger and the debuggee permit direct access by the debugger to all memory regions of the debuggee, thus eliminating calls to the operating system and resultant context switches for memory access. In this manner, the debuggee is executed and analyzed in real time by the debugger without significant consumption of computer resources.

Embodiments are best understood by reference to the following detailed description when read in conjunction with the accompanying drawings.

BRIEF DESCRIPTION OF THE DRAWINGS

FIG. 2 is a flow diagram of a debugger operation, in accordance with one embodiment of the present invention;

FIG. 3 is a flow diagram of an injected thread operation, in accordance with one embodiment of the present invention;

FIG. 4 is a flow diagram of a map all memory regions of debuggee to debugger operation of the debugger operation of FIG. 2, in accordance with one embodiment of the present invention;

FIG. 5 is a flow diagram of a map private memory regions operation of the map all memory regions of debuggee to debugger operation of FIG. 4, in accordance with one embodiment of the present invention;

FIG. 6 is a flow diagram of a new debuggee shared memory region mapped operation, in accordance with one embodiment of the present invention;

FIG. 8 is a flow diagram of a private memory region allocation operation, in accordance with one embodiment of the present invention; and FIG. 9 is a flow diagram of a private memory region deallocation operation, in accordance with one embodiment of the present invention.

Common reference numerals are used throughout the drawings and detailed description to indicate like elements.

DETAILED DESCRIPTION

Figure 1:
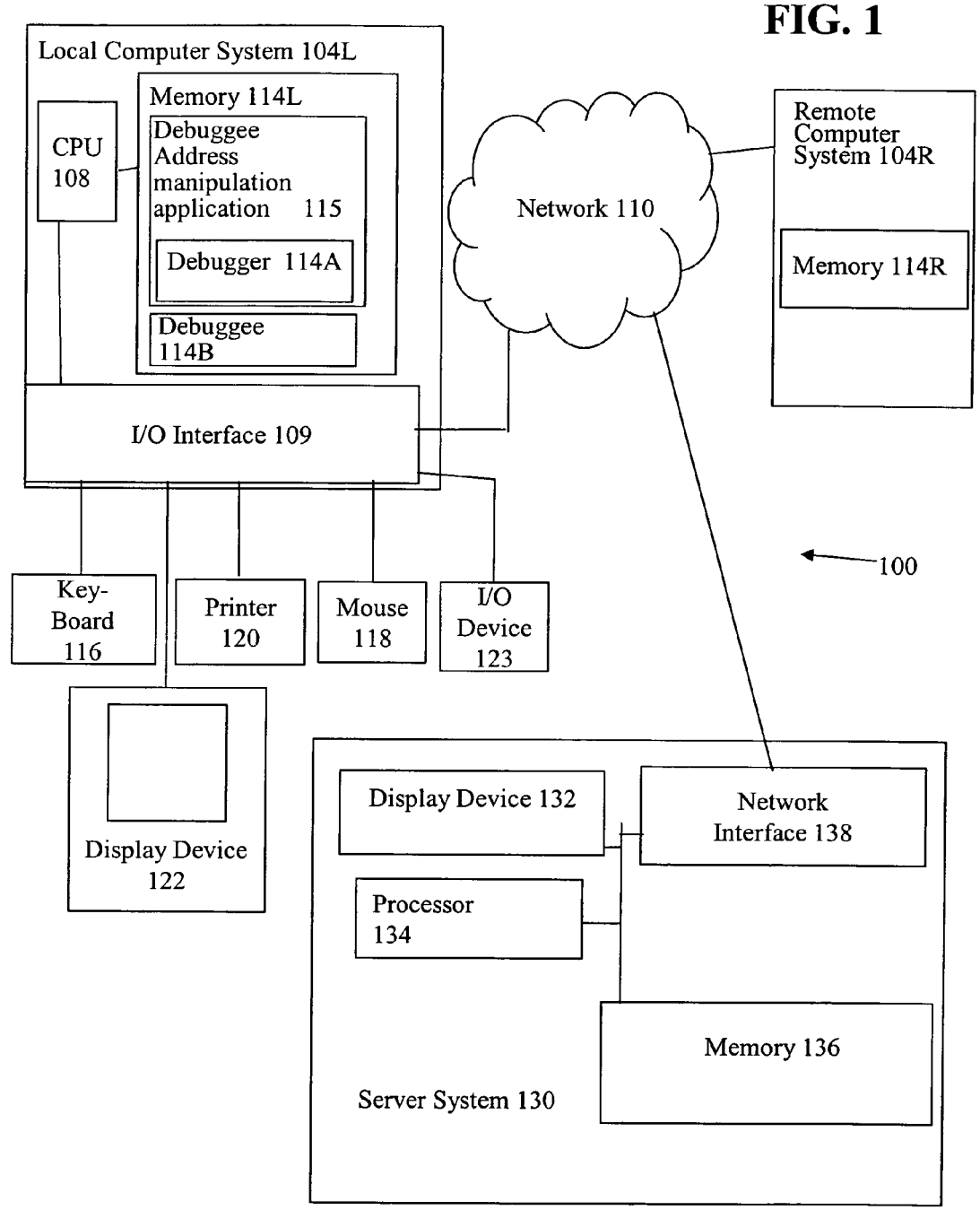
FIG. 1 is a diagram of a client-server system that includes a debuggee address manipulation application executing on a computer system, in accordance with one embodiment of the present invention.

Embodiments of the present invention provide a system and method for the memory of a debuggee to be analyzed by a debugger without a context switch. More particularly, the debuggee's memory is directly and transparently accessed and manipulated by the debugger without a context switch from user mode to kernel mode.

In one embodiment, the debuggee, e.g., a first process, sometimes called a remote process, is a user mode process. Examples of debuggees include software code suspected of containing malicious code and goat processes. In one example, packed executables are executed in the debuggee and the execution is analyzed by the debugger.

In one embodiment, the debugger, e.g., a second process, sometimes called a local process, is a user mode process. Examples of debuggers include software code that analyzes the debuggee. User mode and kernel mode processes are discussed more fully below in conjunction with FIG. 1.

Malicious code defines any computer program, module, set of modules, or code that enters a computer system environment without an authorized user's knowledge and/or without an authorized user's consent.

Analyzing a process includes examining a software code module and the results of execution of portions or all of the software code module.

In one embodiment, and with reference to FIG. 2, a method of the present invention includes creating the debuggee in a suspended state (FIG. 2, operation 204). The debuggee is injected with a thread and the debugger sleeps until woken up by the injected thread in the debuggee (FIG. 2, operations 208 and 210).

With reference to FIG. 3, the injected thread establishes communication with the debugger (FIG. 3, operation 304). Functions for allocating and freeing virtual memory as well as functions for mapping and unmapping shared memory regions are hooked (FIG. 3, operations 306 and 308). A list of all memory regions of the debuggee is generated (FIG. 3, operation 310). For each memory region mapped as a shared memory region, e.g., an old debuggee shared memory region, (FIG. 3, operation 312), an old debuggee shared memory region handle is provided, e.g., added to the list of all memory regions (FIG. 3, operation 314). The list of all memory regions is stored (FIG. 3, operation 318). The debugger is awakened and the injected thread sleeps until woken up by the debugger (FIG. 3, operations 320 and 322).

With reference again to FIG. 2 and with reference to FIGS. 4 and 5, all memory regions of the debuggee listed on the stored list are mapped to the debugger (FIG. 2, operation 212). For example, the old debuggee shared memory region handles listed on the stored list are used to map the old debuggee shared memory regions to the debugger (FIG. 4, operation 404), and the private memory regions of the debuggee are mapped to the debugger as new debugger shared memory regions, where each new debugger shared memory region corresponds in size to a private memory region (FIG. 4, operation 406 and FIG. 5, operation 504). The content of each private memory region (except the injected thread) is transferred to the corresponding new debugger shared memory region (FIG. 5, operation 506). The private memory regions are freed, except for the private memory region containing the injected thread (FIG. 5, operation 508). New debugger shared memory region handles are provided for use by the debuggee of the new debugger shared memory regions (FIG. 5, operation 510). The injected thread is awakened (FIG. 2, operation 214).

With reference again to FIG. 3, the new debugger shared memory region handles are used to map the new debugger shared memory regions to the debuggee (FIG. 3, operation 324) and the debuggee is un-suspended (FIG. 3, operation 326).

In this manner, the debugger is able to directly and efficiently read from and write to the shared memory regions of the debuggee without calls to the operating system and resultant context switches for memory access.

More particularly, FIG. 1 is a diagram of a computer system or computer network 100 that includes a local, e.g., first, computer system 104L. Local computer system 104L further includes a debuggee, e.g., first process, 114B. Local computer system 104L includes a debuggee address manipulation application 115, in accordance with one embodiment of the present invention. Debuggee address manipulation application 115 includes a debugger, e.g., second process, 114A.

Local computer system 104L, sometimes called a client or user device, typically includes a central processing unit (CPU) 108, sometimes called a processor 108, an input/output (I/O) interface 109, and a memory 114L. Local computer system 104L further includes standard devices like a keyboard 116, a mouse 118, a printer 120, and a display device 122, as well as one or more standard input/output (I/O) devices 123, such as a compact disk (CD) or DVD drive, floppy disk drive, or other digital or waveform ports for inputting data to and outputting data from local computer system 104L.

In one embodiment, debuggee address manipulation application 115 is loaded into local computer system 104L via I/O device 123, such as from a CD, DVD, or floppy disk containing debuggee address manipulation application 115.

Local computer system 104L is coupled to a server system 130 of computer system 100, e.g., client-server computer system, by a network 110. Server system 130 typically includes a display device 132, a processor 134, a memory 136, and a network interface 138. Additional computer systems such as remote, e.g., a second, computer system 104R are also associated with the network 110. Remote computer system 104R includes, for example, memory 114R.

Network 110 can be any network or network system that is of interest to a user. In various embodiments, network interface 138 and I/O interface 109 include analog modems, digital modems, or a network interface card.

Debuggee address manipulation application 115 is stored, for example, in memory 114L of local computer system 104L and executed on local computer system 104L.

The particular type of and configuration of local computer system 104L, server system 130, and remote computer system 104R are not essential to this embodiment of the present invention.

In one embodiment, for example, memory 114L includes a page-based virtual memory system that uses pages, e.g., 4096 byte memory areas. Contiguous pages having the same attributes are called memory regions. A memory region is sometimes identified by an address of the first byte of the memory region, i.e., a starting address, as well as a size, i.e., the number of bytes in the memory region. Memory regions directly accessible by more than one process are called shared memory regions. Memory regions specifically created for access by only one process are called private memory regions.

More particularly, some computing environments such as Windows® NT and Windows® 2000 provide page-based virtual memory management schemes that permit programs to realize a 4 GB (gigabyte) virtual memory address space. When the computer system processor is running in virtual memory mode, all addresses are assumed to be virtual addresses and are translated, or mapped, to physical addresses in main memory each time the processor executes a new instruction to access memory. Addresses are sometimes called pointers. Translated addresses, i.e., cross-referenced virtual addresses and physical addresses, are sometimes called a mapping. One example of a mapping is a page table. A handle, sometimes called a shared memory region handle, refers to a reference key to a shared memory region. For example, a shared memory region handle identifies a particular shared memory region.

Conventionally, the 4 GB virtual memory address space is divided into two parts: a lower 2 GB user address space, also referred to as user mode address space or ring 3, available for use by a program; and, a high 2 GB system address space, also referred to as kernel mode address space or ring 0, reserved for use by the operating system.

In Windows® NT and Windows® 2000, memory is divided into equal portions termed pages. For example, on 32-bit Intel architectures, also known as IA32, pages are 4 KB in size, whereas Windows® 2000 on an Alpha CPU would use 8 KB pages.

To protect the integrity of the operating system code and other kernel address space code and data structures from errant or malicious programs and to provide efficient system security, i.e., user rights management, Windows® NT and Windows® 2000 separate code executing in the user address space, e.g., user mode, from code executing in the kernel address space, e.g., kernel mode. User mode code typically does not have direct access to kernel mode code and has restricted access to computer system resources and hardware.

To utilize kernel mode code functionalities, such as access to disk drives and network connections, user mode programs utilize system calls that interface between the user mode and kernel mode functions.

Memory, such as memory 114L, provides computer storage for content, sometimes called memory content. Examples of content include data and software code, e.g., computer instructions.

In one embodiment, memory 114L, e.g., including physical memory, as referenced above, includes memory regions, sometimes called regions. More particularly, FIG. 1A is a diagram of a portion of memory 114L of the client-server system of FIG. 1 during a first stage of processing, in accordance with one embodiment of the present invention.

Figure 1A:
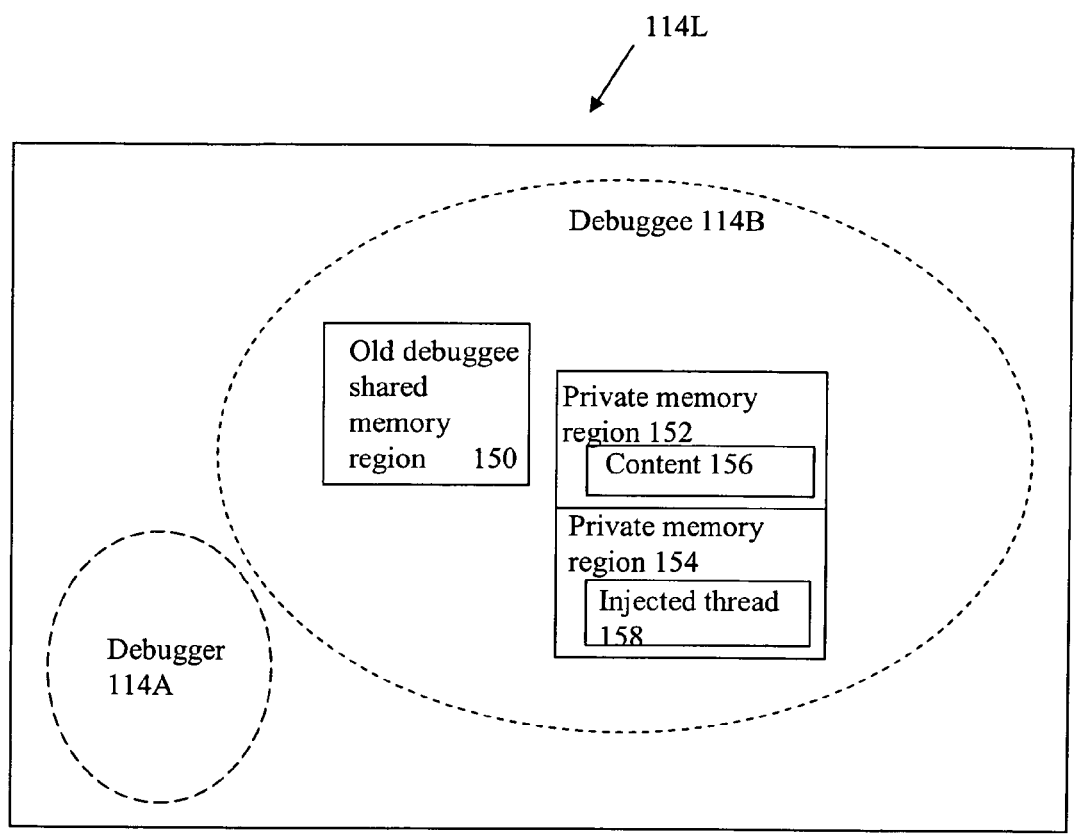
FIG. 1A is a diagram of a portion of a memory of the client-server system of FIG. 1 during a first stage of processing, in accordance with one embodiment of the present invention.

Referring now to FIG. 1A, the portion of memory 114L includes private memory regions such as private memory regions 152 and 154 of debuggee 114B. Memory 114L further includes shared memory regions such as old debuggee shared memory regions. Old debuggee shared memory regions are shared memory regions initially mapped to the debuggee and not mapped to the debugger. One example of an old debuggee shared memory region is old debuggee shared memory region 150. Old debuggee shared memory region 150 is mapped to debuggee 114B. This mapping permits debuggee 114B to access old debuggee shared memory region 150 directly.

To illustrate, debuggee 114B is allocated three memory regions: old debuggee shared memory region 150, private memory region 152 having content 156, and private memory region 154 having an injected thread 158. Debuggee 114B can directly access content of old debuggee shared memory region 150 and private memory regions 152, 154. The access includes allowing reading and/or writing to associated content, e.g., content 156 and injected thread 158.

Debugger 114A is loaded into memory 114L. Old debuggee shared memory region 150 is not mapped to debugger 114A. Debugger 114A cannot directly access content of old debuggee shared memory region 150 or private memory regions 152, 154 at this stage in processing.

FIG. 2 is a flow diagram of a debugger operation 200 in accordance with one embodiment of the present invention. FIG. 3 is a flow diagram of an injected thread operation 300 in accordance with one embodiment of the present invention. Referring now to FIGS. 1, 1A, 2, and 3 together, execution of debuggee address manipulation application 115 by CPU 108 results in the operations of debugger operation 200 and injected thread operation 300, as described below in one embodiment.

From an ENTER OPERATION 202 of debugger operation 200, flow moves to a CREATE DEBUGGEE IN SUSPENDED STATE OPERATION 204. In CREATE DEBUGGEE IN SUSPENDED STATE OPERATION 204, a debuggee, e.g., debuggee 114B, is created in a suspended state.

Alternatively, if a debuggee has already been created, flow moves from ENTER OPERATION 202 to a SUSPEND DEBUGGEE OPERATION 206. In SUSPEND DEBUGGEE OPERATION 206, the debuggee, already created, is suspended.

From CREATE DEBUGGEE IN SUSPENDED STATE OPERATION 204 or, alternatively, from SUSPEND DEBUGGEE OPERATION 206, flow moves to an INJECT THREAD INTO DEBUGGEE OPERATION 208. In INJECT THREAD INTO DEBUGGEE OPERATION 208, a thread is injected into the debuggee, e.g., injected thread 158 of private memory region 154. The thread, sometimes called an injected thread, performs various operations, as further described. In this manner, the injected thread serves as a tool to manipulate the debuggee and communicate with the debugger.

Injection of the thread into the debuggee is accomplished by any one of a number of techniques well known to those of skill in the art and the particular technique used is not essential to this embodiment.

One such technique, for example, includes allocating a private memory region for the thread to be injected. The private memory region is allocated using a function that allocates, i.e., reserves or commits, a memory region within the virtual address space of a specified process. For example, a VirtualAllocEx function of the Windows® operating system allocates a private memory region for the debuggee. The thread is copied into the allocated private memory region. A pointer to the start address of the thread is created.

From INJECT THREAD INTO DEBUGGEE OPERATION 208, flow moves to a SLEEP UNTIL WOKEN UP BY INJECTED THREAD IN DEBUGGEE OPERATION 210. In SLEEP UNTIL WOKEN UP BY INJECTED THREAD IN DEBUGGEE OPERATION 210, the debugger sleeps until awakened, e.g., signaled by the injected thread.

Referring now to FIG. 3, from an ENTER OPERATION 302, flow moves to an ESTABLISH COMMUNICATION WITH THE DEBUGGER OPERATION 304. In ESTABLISH COMMUNICATION WITH THE DEBUGGER OPERATION 304, communication is established (or reestablished, if previously established) with the debugger. For example, a shared memory region such as a page is mapped to the injected thread (the debuggee) and to the debugger. The page is sometimes called a communication page. The injected thread and the debugger can each read content from or write content to the communication page. Each can signal the other to read the content of the communication page. In this manner, the injected thread facilitates communication with the debugger.

Figure 1B:
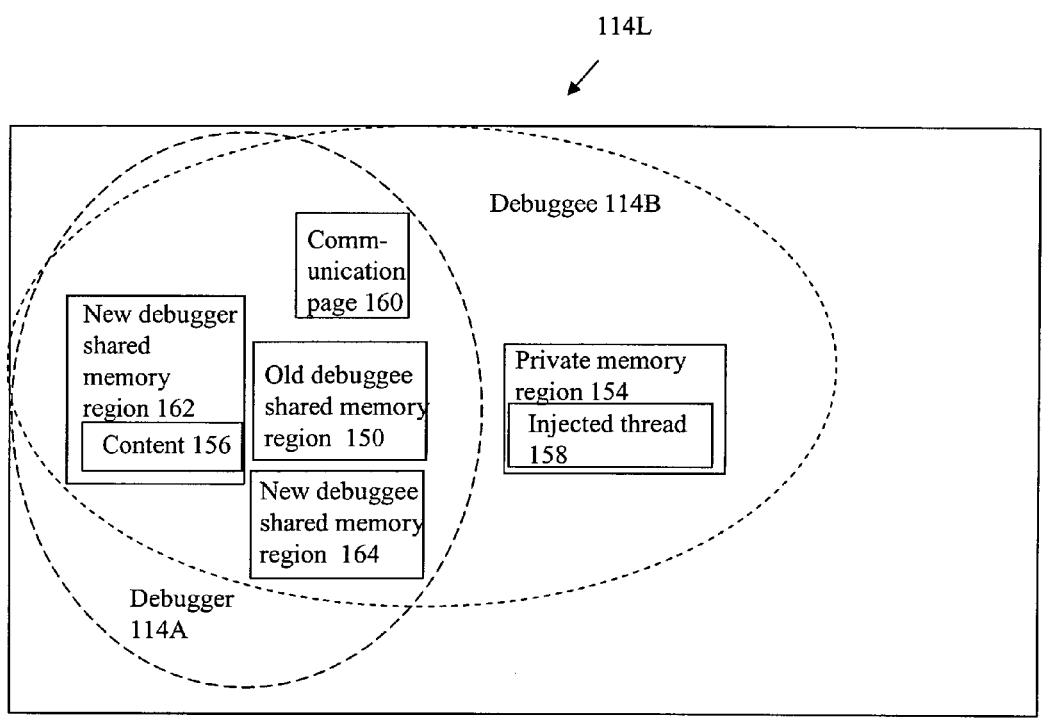
FIG. 1B is a diagram of the portion of memory of the client-server system of FIG. 1 during a second stage of processing, in accordance with one embodiment of the present invention.

To illustrate, FIG. 1B is a diagram of the portion of memory of the client-server system of FIG. 1 during a second stage of processing, in accordance with one embodiment of the present invention. Referring now to FIG. 1B, injected thread 158 and debugger 114A communicate via a communication page 160.

With reference again to FIG. 3, from ESTABLISH COMMUNICATION WITH THE DEBUGGER OPERATION 304, flow moves to a HOOK ALLOCATE VIRTUAL MEMORY FUNCTION AND FREE VIRTUAL MEMORY FUNCTION OPERATION 306. In HOOK ALLOCATE VIRTUAL MEMORY FUNCTION AND FREE VIRTUAL MEMORY FUNCTION OPERATION 306, a function used to allocate virtual memory, i.e., reserve or commit a memory region, is hooked. A function used to free virtual memory, i.e., release or decommit a memory region, is also hooked.

For example, at least one memory allocation/deallocation function running on local computer system 104L is hooked. In this manner, allocation and deallocation of memory is controlled.

Hooking is accomplished according to a variety of techniques, as is well known in the art. To illustrate, Windows® operating system functions NtAllocateVirtualMemory and NtFreeVirtualMemory are hooked to facilitate interception of invocation of, e.g., calls to, the operating system functions. In one embodiment, the operating system function is hooked by inserting a jump instruction directly into the operating system function.

As is well known to those of skill in the art, a system service table, sometimes called a dispatch table or a system call table, relates system calls to specific addresses within an operating system kernel. In one embodiment, a hooked system service table redirects memory allocation/deallocation function calls. For example, the hooked system service table redirects a memory allocation/deallocation function call to a module of debuggee address manipulation application 115 executing in memory instead of directing the memory allocation/deallocation function call to the memory allocation/deallocation function of the operating system.

From HOOK ALLOCATE VIRTUAL MEMORY FUNCTION AND FREE VIRTUAL MEMORY FUNCTION OPERATION 306, flow moves to a HOOK MAP SHARED MEMORY REGION FUNCTION AND UNMAP SHARED MEMORY REGION FUNCTION OPERATION 308. In HOOK MAP SHARED MEMORY REGION FUNCTION AND UNMAP SHARED MEMORY REGION FUNCTION OPERATION 308, functions used to map a shared memory region and to unmap a shared memory region are hooked. For example, at least one memory mapping/unmapping function running on local computer system 104L is hooked. In this manner, mapping and unmapping are controlled, as discussed below.

As previously discussed, hooking is accomplished according to a variety of techniques, as is well known in the art. To illustrate, Windows® operating system functions NtMapViewOfSection and NtUnMapViewOfSection are hooked to facilitate interception of invocation of, e.g., calls to, the operating system functions.

From HOOK MAP SHARED MEMORY REGION FUNCTION AND UNMAP SHARED MEMORY REGION FUNCTION OPERATION 308, flow moves to a GENERATE LIST OF ALL MEMORY REGIONS OPERATION 310. In GENERATE LIST OF ALL MEMORY REGIONS OPERATION 310, a list of all memory regions, including shared memory regions and private memory regions, associated with the debuggee is generated. The memory regions may be, for example, old debuggee shared memory regions, such as old debuggee shared memory region 150, private memory regions, such as private memory regions 152, 154 of the debuggee, or a combination of both. In this manner, each memory region can be further analyzed and processed.

To illustrate, the injected thread identifies each memory region associated with the debuggee and compiles, or writes, each identified memory region to a list. The list will be accessed by the debugger. For example, the list includes an entry for each memory region. The entry has the starting address of the memory region, the size of the memory region, and a privilege level for the memory region, e.g., whether the memory region is a shared memory region or a private memory region.

From GENERATE LIST OF ALL MEMORY REGIONS OPERATION 310, flow moves to a MEMORY REGION SHARED CHECK OPERATION 312. In MEMORY REGION SHARED CHECK OPERATION 312, each memory region in the list of all memory regions is checked to determine if the memory region is a shared memory region, e.g., an old debuggee shared memory region, such as old debuggee shared memory region 150.

If a determination is made in MEMORY REGION SHARED CHECK OPERATION 312 that the memory region is a shared memory region, flow moves from MEMORY REGION SHARED CHECK OPERATION 312 to a PROVIDE OLD DEBUGGEE SHARED MEMORY REGION HANDLE FOR DEBUGGER USE OPERATION 314. In PROVIDE OLD DEBUGGEE SHARED MEMORY REGION HANDLE FOR DEBUGGER USE OPERATION 314, an old debuggee shared memory region handle, e.g., a pointer to the starting address in memory for the old debuggee shared memory region, is provided. The old debuggee shared memory region handle will be used to facilitate mapping of the associated old debuggee shared memory region to the debugger, as discussed below. In this manner, the debugger will be able to access content of the associated old debuggee shared memory region.

To illustrate, as shown in FIG. 1A, a handle, sometimes called an object handle, for old debuggee shared memory region 150 is duplicated. For example, injected thread 158 calls a DuplicateHandle function of a Windows® operating system to duplicate the handle for old debuggee shared memory region 150. The duplicated handle is added to the corresponding entry for old debuggee shared memory region 150 in the list.

If a determination is made in MEMORY REGION SHARED CHECK OPERATION 312 that a memory region is not shared, flow moves from MEMORY REGION SHARED CHECK OPERATION 312 to a MORE MEMORY REGIONS TO PROCESS CHECK OPERATION 316. Alternatively, flow moves from PROVIDE OLD DEBUGGEE SHARED MEMORY REGION HANDLE FOR DEBUGGER USE OPERATION 314 to MORE MEMORY REGIONS TO PROCESS CHECK OPERATION 316.

In MORE MEMORY REGIONS TO PROCESS CHECK OPERATION 316, a determination is made if any entries for memory regions in the list need to be processed, e.g., if a memory region still needs to be checked to determine if the memory region is a shared memory region in MEMORY REGION SHARED CHECK OPERATION 312, as described above.

If a determination is made in MORE MEMORY REGIONS TO PROCESS CHECK OPERATION 316 that a memory region has not been processed, flow returns to MEMORY REGION SHARED CHECK OPERATION 312.

Conversely, if a determination is made in MORE MEMORY REGIONS TO PROCESS CHECK OPERATION 316 that no memory regions remain to be processed, flow moves to a STORE LIST OF ALL MEMORY REGIONS OPERATION 318. In STORE LIST OF ALL MEMORY REGIONS OPERATION 318, the list of all memory regions is stored for access by the debugger. The list is sometimes called the stored list. In this manner, the debugger can access the stored list, as discussed below.

To illustrate, as shown in FIG. 1B, the list of all memory regions is stored in a communication page 160, accessible to both debugger 114A and debuggee 114B.

From STORE LIST OF ALL MEMORY REGIONS OPERATION 318, flow moves to a WAKE UP DEBUGGER OPERATION 320. In WAKE UP DEBUGGER OPERATION 320, the debugger is awakened, e.g., signaled using an event.

From WAKE UP DEBUGGER OPERATION 320, flow moves to a SLEEP UNTIL WOKEN UP BY DEBUGGER OPERATION 322. In SLEEP UNTIL WOKEN UP BY DEBUGGER OPERATION 322, the injected thread sleeps until awakened, e.g., waits on an event signaled by the debugger.

With particular attention again to FIG. 2, as a result of performance of WAKE UP DEBUGGER OPERATION 320, discussed above, the debugger is awakened in SLEEP UNTIL WOKEN UP BY INJECTED THREAD IN DEBUGGEE OPERATION 210, and flow moves to a MAP ALL MEMORY REGIONS OF DEBUGGEE TO DEBUGGER OPERATION 212. In MAP ALL MEMORY REGIONS OF DEBUGGEE TO DEBUGGER OPERATION 212, the debugger accesses the stored list of memory regions returned by the injected thread, i.e., stored in STORE LIST OF ALL MEMORY REGIONS OPERATION 318. For example, the debugger accesses the stored list in communication page 160 (shown in FIG. 1B). The debugger maps all the memory regions provided in the list, e.g., the old debuggee shared memory regions and the private memory regions of the debuggee. In this manner, the debugger has a complete mapping of the memory regions of the debuggee.

Mapping of all the memory regions of the debuggee is accomplished via a variety of techniques. FIG. 4 is a flow diagram of a map all memory regions of debuggee to debugger operation 212 of debugger operation 200, in accordance with one embodiment of the present invention. Referring now to FIG. 4, from an ENTER OPERATION 402, flow moves to a MAP SHARED MEMORY REGIONS OPERATION 404. In MAP SHARED MEMORY REGIONS OPERATION 404, the old debuggee shared memory regions are mapped to the debugger. In this manner, the debugger can directly access all old debuggee shared memory regions.

In one embodiment, the old debuggee shared memory region handles are acquired from the stored list and used to map the associated old debuggee shared memory regions to the debugger.

To illustrate, as shown in FIG. 1B, old debuggee shared memory region 150 is now mapped to both debuggee 114B and debugger 114A.

In one embodiment, an old debuggee shared memory region is mapped to the debugger using an address matching scheme, i.e., identical virtual addressing exists between the debuggee and the debugger for a particular shared memory region. For example, with respect to a particular old debuggee shared memory region, the virtual addresses of the debugger match the virtual addresses of the debuggee. An address matching scheme eliminates the need for pointer resolution when accessing the old debuggee shared memory region.

To illustrate, as shown in FIG. 1B, the starting address for old debuggee shared memory region 150 mapped to debuggee 114B is 1000, i.e., virtual address 1000 of debuggee 114B. When old debuggee shared memory region 150 is mapped to debugger 114A, it is mapped starting at virtual address 1000 of debugger 114A.

In another embodiment, an address matching scheme is not used, i.e., the virtual addresses of the debugger differ from the virtual addresses of the debuggee for a particular shared memory region. In this manner, an old debuggee shared memory region is mapped to the debugger when the virtual address of the debugger matching the virtual address of the debuggee is not available, e.g., already mapped.

To illustrate, the starting address for old debuggee shared memory region 150 mapped to debuggee 114B is 1000, i.e., virtual address 1000 of debuggee 114B. When old debuggee shared memory region 150 is mapped to debugger 114A, virtual address 1000 of debugger 114A is not available. Instead, old debuggee shared memory region 150 is mapped to debugger 114A starting at virtual address 10,000 of debugger 114B. A relative difference of 9,000 exists between the virtual addresses of debugger 114A and the virtual addresses of debuggee 114B. Therefore, to resolve a pointer address, a delta of 9,000 is applied.

From MAP SHARED MEMORY REGIONS OPERATION 404, flow moves to a MAP PRIVATE MEMORY REGIONS OPERATION 406. In MAP PRIVATE MEMORY REGIONS OPERATION 406, each private memory region of the debuggee is duplicated as a shared memory region mapped to the debugger and the debuggee, and content of each private memory region is transferred to the corresponding shared memory region, as further described below. In this manner, the debugger and the debuggee have direct access to content formerly accessible only by the debuggee, i.e., content of the private memory regions of the debugger.

From MAP PRIVATE MEMORY REGIONS OPERATION 406, flow exits in an EXIT OPERATION 408.

In one embodiment, mapping of the private memory regions of the debuggee is accomplished via various techniques. FIG. 5 is a flow diagram of map private memory regions operation 406 of map all memory regions of debuggee to debugger operation 212, in accordance with one embodiment of the present invention.

Referring now to FIG. 5, from an ENTER OPERATION 502, flow moves to a CREATE A NEW DEBUGGER SHARED MEMORY REGION THAT MATCHES THE SIZE OF THE PRIVATE MEMORY REGION OF DEBUGGEE OPERATION 504. In CREATE A NEW DEBUGGER SHARED MEMORY REGION THAT MATCHES THE SIZE OF THE PRIVATE MEMORY REGION OF DEBUGGEE OPERATION 504, the stored list is examined. For the first entry for a private memory region of the debuggee, a corresponding shared memory region is created and mapped to the debugger. The corresponding shared memory region, sometimes called a new debugger shared memory region, matches the size of the associated private memory region of the debuggee. In this manner, the shared memory region that corresponds in size to the private memory region of the debuggee can be manipulated, as further described.

To illustrate, as shown in FIG. 1B, new debugger shared memory region 162 is created and mapped to debugger 114A.

From CREATE A NEW DEBUGGER SHARED MEMORY REGION THAT MATCHES THE SIZE OF THE PRIVATE MEMORY REGION OF DEBUGGEE OPERATION 504, flow moves to a TRANSFER CONTENT OF PRIVATE MEMORY REGION OF DEBUGGEE INTO NEW DEBUGGER SHARED MEMORY REGION OPERATION 506. In TRANSFER CONTENT OF PRIVATE MEMORY REGION OF DEBUGGEE INTO NEW DEBUGGER SHARED MEMORY REGION OPERATION 506, the content of the private memory region of the debuggee is transferred to the corresponding new debugger shared memory region created and mapped in CREATE A NEW DEBUGGER SHARED MEMORY REGION THAT MATCHES THE SIZE OF THE PRIVATE MEMORY REGION OF DEBUGGEE OPERATION 504. In this manner, the debugger can directly access the content previously associated with the private memory region of the debuggee.

To illustrate, as shown in FIGS. 1A and 1B, Windows® operating system function ReadProcessMemory is used to read content 156 of private memory region 152 of debuggee 114B (FIG. 1A). Content 156 is copied to corresponding new debugger shared memory region 162. Content 156 is accessible by debugger 114A (FIG. 1B).

From TRANSFER CONTENT OF PRIVATE MEMORY REGION OF DEBUGGEE INTO NEW DEBUGGER SHARED MEMORY REGION OPERATION 506, flow moves to a FREE PRIVATE MEMORY REGION OF DEBUGGEE UNLESS PRIVATE MEMORY REGION ALLOCATED FOR THE INJECTED THREAD OPERATION 508. In FREE PRIVATE MEMORY REGION OF DEBUGGEE UNLESS PRIVATE MEMORY REGION ALLOCATED FOR THE INJECTED THREAD OPERATION 508, the private memory region of the debuggee is freed, unless the private memory region is associated with the injected thread. In this manner, judicious use of computer resources, e.g., memory, is ensured.

To illustrate, as shown in FIGS. 1A and 1B, private memory region 152 of the debuggee is examined. Private memory region 152 is not associated with injected thread 158, and Windows® operating system VirtualFreeEx function is called. The VirtualFreeEx function decommits private memory region 152.

From FREE PRIVATE MEMORY REGION OF DEBUGGEE UNLESS PRIVATE MEMORY REGION ALLOCATED FOR THE INJECTED THREAD OPERATION 508, flow moves to a PROVIDE NEW DEBUGGER SHARED MEMORY REGION HANDLE FOR DEBUGGEE USE OPERATION 510. In PROVIDE NEW DEBUGGER SHARED MEMORY REGION HANDLE FOR DEBUGGEE USE OPERATION 510, a new debugger shared memory region handle, e.g., a pointer to the starting address in memory for the new debugger shared memory region, is provided. The new debugger shared memory region handle will be provided to facilitate mapping of the new debugger share memory region to the debuggee, as further described below. In this manner, the debuggee will be able to access the new debugger shared memory region and associated content, as further described below.

To illustrate, a handle, sometimes called an object handle or additional handle, for the new debugger shared memory region is duplicated. For example, the injected thread calls a DuplicateHandle function of a Windows® operating system to duplicate the handle for the new debugger shared memory region. The duplicated handle is added to the stored list.

From PROVIDE NEW DEBUGGER SHARED MEMORY REGION HANDLE FOR DEBUGGEE USE OPERATION 510, flow moves to a MORE PRIVATE MEMORY REGIONS OF DEBUGGEE CHECK OPERATION 512. In MORE PRIVATE MEMORY REGIONS OF DEBUGGEE CHECK OPERATION 512, a determination is made whether any private memory regions remain to be processed, as previously described.

If a determination is made that a private memory region remains to be processed, flow returns to CREATE A NEW DEBUGGER SHARED MEMORY REGION THAT MATCHES THE SIZE OF THE PRIVATE MEMORY REGION OF DEBUGGEE OPERATION 504, and the next private memory region is processed as described above.

Conversely, if a determination is made that no private memory regions remain to be processed, flow exits in an EXIT OPERATION 514.

With particular attention again to FIG. 2, flow moves from MAP ALL MEMORY REGIONS OF DEBUGGEE TO DEBUGGER OPERATION 212 to a WAKE UP INJECTED THREAD IN DEBUGGEE OPERATION 214. In WAKE UP INJECTED THREAD IN DEBUGGEE OPERATION 214, the injected thread put to sleep in SLEEP UNTIL WOKEN UP BY DEBUGGER OPERATION 322 is awakened, e.g., signaled by an event. In this manner, the injected thread is notified that mapping of all memory regions of the debuggee to the debugger is complete.

With particular attention again to FIG. 3, as a result of performance of WAKE UP INJECTED THREAD IN DEBUGGEE OPERATION 214, discussed above, the injected thread is awakened in SLEEP UNTIL WOKEN UP BY DEBUGGER OPERATION 322, and flow moves to a MAP NEW DEBUGGER SHARED MEMORY REGION TO DEBUGGEE OPERATION 324. In MAP NEW DEBUGGER SHARED MEMORY REGION TO DEBUGGEE OPERATION 324, the new debugger shared memory regions are mapped to the debuggee using the associated new debugger shared memory region handles provided in PROVIDE NEW DEBUGGER SHARED MEMORY REGION HANDLE FOR DEBUGGEE USE OPERATION 510. In this manner, the debuggee can access the new debugger shared memory regions and the associated content.

To illustrates, as shown in FIG. 1B, the new debugger shared memory region 162 is now mapped to both debugger 114A and debuggee 114B, and both can access content 156.

In one embodiment, the new debugger shared memory regions are mapped to virtual addresses of the debuggee corresponding to the private memory regions decommitted in FREE PRIVATE MEMORY REGION OF DEBUGGEE UNLESS PRIVATE MEMORY REGION ALLOCATED FOR THE INJECTED THREAD OPERATION 508. Because the private memory regions were decommitted, but not released, the decommitted private memory regions remain available for mapping to the debuggee. Further, because the size of the new debugger shared memory regions match the size of the corresponding decommitted private memory regions, the new debugger shared memory regions precisely utilize the decommitted private memory regions of the debugger. In this manner, memory resources are used efficiently.

From MAP NEW DEBUGGER SHARED MEMORY REGION TO DEBUGGEE OPERATION 324, flow moves to an UN-SUSPEND DEBUGGEE OPERATION 326. In UN-SUSPEND DEBUGGEE OPERATION 326, the debuggee is un-suspended, e.g., execution resumes. Content of the decommitted private memory regions of the debuggee is now accessible by both the debuggee and the debugger, i.e., content transferred to the new debugger shared memory regions mapped to both the debuggee and the debugger. Content of the old debuggee shared memory regions of the debuggee is now accessible by both the debuggee and the debugger.

In one embodiment, pages of the new debugger shared memory regions are not marked as copy-on-write, and the changes made by one process, e.g., the debuggee, are immediately visible to the other process, e.g., the debugger.

Further, in one embodiment, the injected thread is kept alive to maintain, for example, the communication means with the debugger. In another embodiment, the injected thread is terminated.

From UN-SUSPEND DEBUGGEE OPERATION 326, flow exits in an EXIT OPERATION 328.

With particular attention again to FIG. 2, flow moves from WAKE UP INJECTED THREAD IN DEBUGGEE OPERATION 214 to a READ AND/OR WRITE TO SHARED MEMORY REGIONS MAPPED TO DEBUGGEE OPERATION 216. In READ AND/OR WRITE TO SHARED MEMORY REGIONS MAPPED TO DEBUGGEE OPERATION 216, the debugger directly reads and/or writes to content of the shared memory regions now mapped to both the debuggee and the debugger, i.e., the old debuggee shared memory regions mapped to the debugger in MAP SHARED MEMORY REGIONS OPERATION 404 and the new debugger shared memory regions mapped to the debugger in MAP PRIVATE MEMORY REGIONS OPERATION 406 and mapped to the debuggee in MAP NEW DEBUGGER SHARED MEMORY REGION TO DEBUGGEE OPERATION 324.

From READ AND/OR WRITE TO SHARED MEMORY REGIONS MAPPED TO DEBUGGEE OPERATION 216, flow exits in an EXIT OPERATION 218.

The memory regions of the debuggee are now shared memory regions mapped to both the debuggee and the debugger, with the possible exception of the private memory region having the injected thread. Thus, both the debuggee and the debugger can directly access content of the shared memory regions. This accessibility allows the debuggee to be executed and allows the debugger to directly access shared memory regions and directly manipulate associated content of the shared memory regions of the debuggee without operating system intervention. In this manner, the debuggee is executed and analyzed in real time by the debugger without significant consumption of computer resources.

To illustrate, as shown in FIG. 1B, old debuggee shared memory region 150 and new debugger shared memory region 162 are mapped to both debuggee 114B and debugger 114A. Debuggee 114B resumes execution. Debugger 114A reads and writes to content 156 of new debugger shared memory region 162 and to content (not shown) of old debuggee shared memory region 150.

In some circumstances, changes to memory occur after the debuggee is un-suspended and resumes execution. These changes include, for example, allocation and/or mapping of additional memory regions as well as unmapping and/or deallocation of memory regions.

For example, the debuggee is allocated additional memory regions and copies content into the newly allocated memory regions. The debugger is able to directly access the newly allocated memory regions and the associated copied content, as described below. The debugger accesses the newly allocated memory regions without calls to the operating system.

In various embodiments, such changes or prospective changes are monitored and addressed to facilitate direct access of debuggee memory regions by the debugger and to optimize memory resource utilization, e.g., unmapping a shared memory region for the debugger when the shared memory region is unmapped for the debuggee.

In various embodiments, the previously-described hooked functions used to map a shared memory region, to unmap a shared memory region, to allocate virtual memory, and to free virtual memory are implicated in monitoring and addressing changes to debuggee memory, as described below.

In one embodiment, when an additional shared memory region is mapped to the debuggee, i.e., a shared memory region other than an old debuggee shared memory region, the additional shared memory region is also mapped to the debugger.

FIG. 6 is a flow diagram of a new debuggee shared memory region mapped operation 600 in accordance with one embodiment of the present invention. Referring now to FIG. 6, from an ENTER OPERATION 602, flow moves to a MAP SHARED MEMORY REGION FUNCTION HOOK INVOKED CHECK OPERATION 604. In MAP SHARED MEMORY REGION FUNCTION HOOK INVOKED CHECK OPERATION 604, a determination is made whether the map shared memory region function hook is invoked on behalf of the debuggee. The map shared memory region function was hooked in HOOK MAP SHARED MEMORY REGION FUNCTION AND UNMAP SHARED MEMORY REGION FUNCTION OPERATION 308. For example, a determination is made whether the Windows® operating system NtMapViewOfSection function hook is invoked to map a shared memory region to the debuggee. In this manner, the mapping of shared memory regions associated with the debuggee is monitored.

If the map shared memory region function hook is not invoked, flow returns to MAP SHARED MEMORY REGION FUNCTION HOOK INVOKED CHECK OPERATION 604.

Conversely, if the map shared memory region function hook is invoked, a new shared memory region is mapped to the debuggee. The newly-mapped shared memory region is sometimes called a new debuggee shared memory region.

Flow moves from MAP SHARED MEMORY REGION FUNCTION HOOK INVOKED CHECK OPERATION 604 to an APPEND NEW DEBUGGEE SHARED MEMORY REGION TO STORED LIST OPERATION 606. In APPEND NEW DEBUGGEE SHARED MEMORY REGION TO STORED LIST OPERATION 606, an entry for the new debuggee shared memory region mapped to the debuggee is added to the stored list.

From APPEND NEW DEBUGGEE SHARED MEMORY REGION TO STORED LIST OPERATION 606, flow moves to a PROVIDE NEW DEBUGGEE SHARED MEMORY REGION HANDLE FOR DEBUGGER USE OPERATION 314A. In PROVIDE NEW DEBUGGEE SHARED MEMORY REGION HANDLE FOR DEBUGGER USE OPERATION 314A, a new debuggee shared memory region handle to the new debuggee shared memory region is provided for use by the debugger in the same or similar manner to that discussed with reference to PROVIDE OLD DEBUGGEE SHARED MEMORY REGION HANDLE FOR DEBUGGER USE OPERATION 314. The new debuggee shared memory region handle will be used to facilitate mapping of the new debuggee shared memory region to the debugger, as described below.

From PROVIDE NEW DEBUGGEE SHARED MEMORY REGION HANDLE FOR DEBUGGER USE OPERATION 314A, flow moves to a MAP NEW DEBUGGEE SHARED MEMORY REGION TO DEBUGGER OPERATION 608. In MAP NEW DEBUGGEE SHARED MEMORY REGION TO DEBUGGER OPERATION 608, the new debuggee shared memory region is mapped to the debugger using the new debuggee shared memory region handle provided in PROVIDE NEW DEBUGGEE SHARED MEMORY REGION HANDLE FOR DEBUGGER USE OPERATION 314A. In this manner, the debugger can access content of the new debuggee shared memory region.

To illustrate, as shown in FIG. 1B, new debuggee shared memory region 164 is mapped to debuggee 114B and debugger 114A.

From MAP NEW DEBUGGEE SHARED MEMORY REGION TO DEBUGGER OPERATION 608, flow exits in an EXIT OPERATION 610.

In one embodiment, when a shared memory region is unmapped on behalf of the debuggee, the shared memory region is also unmapped on behalf of the debugger. In this manner, the mappings of shared memory regions for the debugger remain consistent with the mappings for the debuggee and memory resources are conserved.

Figure 7:
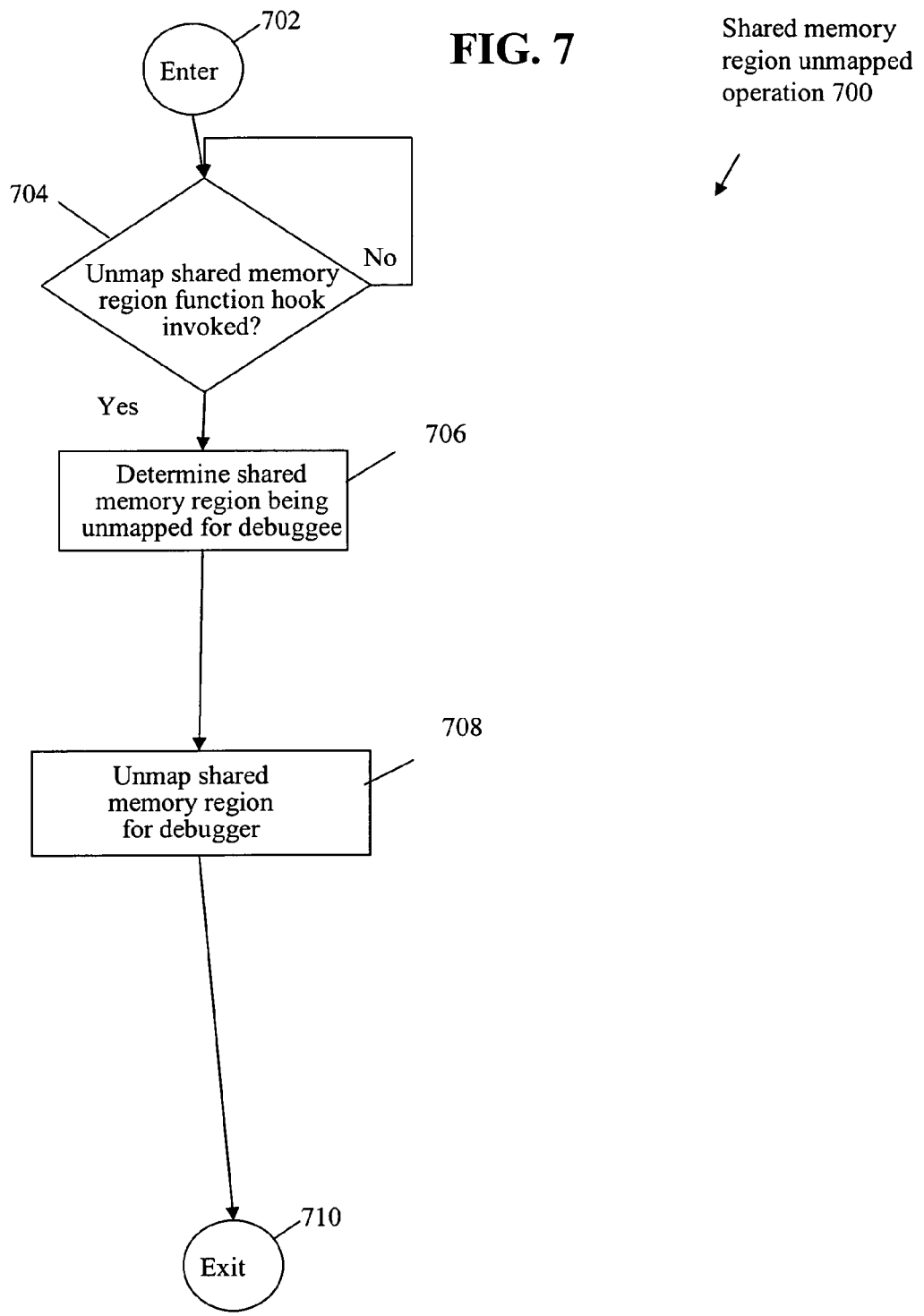
FIG. 7 is a flow diagram of a shared memory region unmapped operation, in accordance with one embodiment of the present invention.

FIG. 7 is a flow diagram of a shared memory region unmapped operation 700 in accordance with one embodiment of the present invention. Referring now to FIG. 7, from an ENTER OPERATION 702, flow moves to an UNMAP SHARED MEMORY REGION FUNCTION HOOK INVOKED CHECK OPERATION 704. In UNMAP SHARED MEMORY REGION FUNCTION HOOK INVOKED CHECK OPERATION 704, a determination is made whether the unmap shared memory region function hook is invoked on behalf of the debuggee. The unmap shared memory region function was hooked in HOOK MAP SHARED MEMORY REGION FUNCTION AND UNMAP SHARED MEMORY REGION FUNCTION OPERATION 308. For example, a determination is made whether the Windows® operating system NtUnmapViewOfSection function hook is invoked to unmap a shared memory region mapped to the debuggee. In this manner, the unmapping of shared memory regions associated with the debuggee is monitored.

If the unmap shared memory region function hook is not invoked, flow returns to UNMAP SHARED MEMORY REGION FUNCTION HOOK INVOKED CHECK OPERATION 704.

Conversely, if the unmap shared memory region function hook is invoked, the shared memory region is unmapped for the debuggee.

Flow moves from UNMAP SHARED MEMORY REGION FUNCTION HOOK INVOKED CHECK OPERATION 704 to a DETERMINE SHARED MEMORY REGION BEING UNMAPPED FOR DEBUGGEE OPERATION 706. In DETERMINE SHARED MEMORY REGION BEING UNMAPPED FOR DEBUGGEE OPERATION 706, the shared memory region being unmapped for the debuggee is determined. Identification of the particular shared memory region being unmapped is also provided. In this manner, the debugger is made aware of changes to the shared memory regions for the debuggee.

From DETERMINE SHARED MEMORY REGION BEING UNMAPPED FOR DEBUGGEE OPERATION 706, flow moves to an UNMAP SHARED MEMORY REGION FOR DEBUGGER OPERATION 708. In UNMAP SHARED MEMORY REGION FOR DEBUGGER OPERATION 708, the shared memory region identified in DETERMINE SHARED MEMORY REGION BEING UNMAPPED FOR DEBUGGEE OPERATION 706 is unmapped on behalf of the debugger. In this manner, the respective mappings of the debuggee and of the debugger of shared memory regions are kept in lockstep, providing additional memory resources for the debugger.

From UNMAP SHARED MEMORY REGION FOR DEBUGGER OPERATION 708, flow exits in an EXIT OPERATION 710.

In one embodiment, when a virtual memory region, e.g., a private memory region, is allocated on behalf of the debuggee, corresponding virtual memory is also allocated on behalf of the debugger. In this manner, virtual memory allocation between the debugger and the debuggee remains consistent.

FIG. 8 is a flow diagram of a private memory region allocation operation 800 in accordance with one embodiment of the present invention. Referring now to FIG. 8, from an ENTER OPERATION 802, flow moves to an ALLOCATE VIRTUAL MEMORY FUNCTION HOOK INVOKED CHECK OPERATION 804. In ALLOCATE VIRTUAL MEMORY FUNCTION HOOK INVOKED CHECK OPERATION 804, a determination is made whether the allocate virtual memory function hook is invoked on behalf of the debuggee, i.e., allocation of a private memory region for the debuggee is attempted. The allocate virtual memory function was hooked in HOOK ALLOCATE VIRTUAL MEMORY FUNCTION AND FREE VIRTUAL MEMORY FUNCTION OPERATION 306. In this manner, requests for allocation of debuggee private memory regions are monitored.

If the allocate virtual memory function hook is not invoked on behalf of the debuggee, flow returns to ALLOCATE VIRTUAL MEMORY FUNCTION HOOK INVOKED CHECK OPERATION 804.

Conversely, if the allocate virtual memory function hook is invoked on behalf of the debuggee, flow moves from ALLOCATE VIRTUAL MEMORY FUNCTION HOOK INVOKED CHECK OPERATION 804 to a PREVENT ALLOCATE VIRTUAL MEMORY FUNCTION FROM EXECUTING ON BEHALF OF DEBUGGEE OPERATION 806. In PREVENT ALLOCATE VIRTUAL MEMORY FUNCTION FROM EXECUTING ON BEHALF OF DEBUGGEE OPERATION 806, the hooked allocate virtual memory function which was attempted to be invoked on behalf of the debuggee is prevented from executing, e.g., the attempt is terminated. In this manner, the allocation of a debuggee private memory region, which would be inaccessible to the debugger, is prevented.

From PREVENT ALLOCATE VIRTUAL MEMORY FUNCTION FROM EXECUTING ON BEHALF OF DEBUGGEE OPERATION 806, flow moves to a PROVIDE INFORMATION ABOUT THE PRIVATE MEMORY REGION TO BE ALLOCATED OPERATION 808. In PROVIDE INFORMATION ABOUT THE PRIVATE MEMORY REGION TO BE ALLOCATED OPERATION 808, information pertinent to the private memory region attempted to be allocated is provided, e.g., the size of the private memory region attempted to be allocated.

From PROVIDE INFORMATION ABOUT THE PRIVATE MEMORY REGION TO BE ALLOCATED OPERATION 808, flow moves to a CREATE A NEW DEBUGGER SHARED MEMORY REGION THAT MATCHES THE SIZE OF THE PRIVATE MEMORY REGION OF DEBUGGEE OPERATION 504A. In CREATE A NEW DEBUGGER SHARED MEMORY REGION THAT MATCHES THE SIZE OF THE PRIVATE MEMORY REGION OF DEBUGGEE OPERATION 504A, a shared memory region is created and mapped to the debugger. The shared memory region corresponds in size to the size provided in PROVIDE INFORMATION ABOUT THE PRIVATE MEMORY REGION TO BE ALLOCATED OPERATION 808.

From CREATE A NEW DEBUGGER SHARED MEMORY REGION THAT MATCHES THE SIZE OF THE PRIVATE MEMORY REGION OF DEBUGGEE OPERATION 504A, flow moves to a PROVIDE NEW DEBUGGER SHARED MEMORY REGION HANDLE FOR DEBUGGEE USE 510. In PROVIDE NEW DEBUGGER SHARED MEMORY REGION HANDLE FOR DEBUGGEE USE 510, a new debugger shared memory region handle for the new debugger shared memory region is provided, as previously described.

From PROVIDE NEW DEBUGGER SHARED MEMORY REGION HANDLE FOR DEBUGGEE USE 510, flow moves to a MAP NEW DEBUGGER SHARED MEMORY REGION TO DEBUGGEE OPERATION 324A. In MAP NEW DEBUGGER SHARED MEMORY REGION TO DEBUGGEE OPERATION 324A, the new debugger shared memory region is mapped to the debuggee using the associated new debugger shared memory region handle. In this manner, the debuggee can access the new shared memory region and associated content.

From MAP NEW DEBUGGER SHARED MEMORY REGION TO DEBUGGEE OPERATION 324A, flow exits in an EXIT OPERATION 810.

In one embodiment, when an attempt is made to free virtual memory, i.e., deallocate a private memory region on behalf of the debuggee, the shared memory region corresponding to the private memory region attempted to be deallocated is unmapped for the debuggee and the debugger. Optionally, the shared memory region is deallocated on behalf of the debugger. In this manner, virtual memory access and allocation between the debugger and the debuggee remains consistent and memory utilization is optimized.

FIG. 9 is a flow diagram of a private memory region deallocation operation 900 in accordance with one embodiment of the present invention. Referring now to FIG. 9, from an ENTER OPERATION 902 flow moves to a FREE VIRTUAL MEMORY FUNCTION HOOK INVOKED CHECK OPERATION 904. In FREE VIRTUAL MEMORY FUNCTION HOOK INVOKED CHECK OPERATION 904, a determination is made whether the free virtual memory function hook is invoked, i.e., whether deallocation of a debuggee private memory region is attempted. The free virtual memory function was hooked in HOOK ALLOCATE VIRTUAL MEMORY FUNCTION AND FREE VIRTUAL MEMORY FUNCTION OPERATION 306. In this manner, requests to deallocate debuggee private memory regions are monitored.

If the free virtual memory function hook is not invoked on behalf of the debuggee, flow returns to FREE VIRTUAL MEMORY FUNCTION HOOK INVOKED CHECK OPERATION 904.

Conversely, if the free virtual memory function hook is invoked, flow moves from FREE VIRTUAL MEMORY FUNCTION HOOK INVOKED CHECK OPERATION 904 to an UNMAP SHARED MEMORY REGION FUNCTION HOOK INVOKED OPERATION 906. In UNMAP SHARED MEMORY REGION FUNCTION HOOK INVOKED OPERATION 906, the unmap shared memory region function hook is invoked, and the shared memory region, e.g., the new debugger shared memory region, corresponding to the private memory region attempted to be deallocated in FREE VIRTUAL MEMORY FUNCTION HOOK INVOKED CHECK OPERATION 904 is unmapped for the debuggee. Put another way, the hooked free virtual memory function is a direct wrapper to the hooked unmap shared memory region function.

From UNMAP SHARED MEMORY REGION FUNCTION HOOK INVOKED OPERATION 906, flow moves to a DETERMINE SHARED MEMORY REGION BEING UNMAPPED FOR DEBUGGEE OPERATION 706. In DETERMINE SHARED MEMORY REGION BEING UNMAPPED FOR DEBUGGEE OPERATION 706, notification is provided to the debugger that a shared memory region is being unmapped for the debuggee, as previously described. Identification of the particular shared memory region being unmapped is also provided, as previously described.

From DETERMINE SHARED MEMORY REGION BEING UNMAPPED FOR DEBUGGEE OPERATION 706, flow moves to an UNMAP SHARED MEMORY REGION FOR DEBUGGER OPERATION 708. In UNMAP SHARED MEMORY REGION FOR DEBUGGER OPERATION 708, the shared memory region identified in DETERMINE SHARED MEMORY REGION BEING UNMAPPED FOR DEBUGGEE OPERATION 706 is unmapped on behalf of the debugger. In this manner, the respective mappings of the debuggee and of the debugger of shared memory regions are kept in lockstep.

From UNMAP SHARED MEMORY REGION FOR DEBUGGER OPERATION 708, flow moves to an optional DEBUGGER DEALLOCATES SHARED MEMORY REGION OPERATION 908. In DEBUGGER DEALLOCATES SHARED MEMORY REGION OPERATION 908, the debugger deallocates, e.g., closes, the shared memory region unmapped in UNMAP SHARED MEMORY REGION OPERATION 708. For example, the debugger is signaled that the shared memory region is no longer needed and the debugger deallocates the shared memory region. In this manner, memory resources are economically used.

From DEBUGGER DEALLOCATES SHARED MEMORY REGION OPERATION 908, flow exits in an EXIT OPERATION 910.

In another embodiment, flow moves from UNMAP SHARED MEMORY REGION FOR DEBUGGER OPERATION 708 to EXIT OPERATION 910, where flow exits. In this manner, after unmapping the shared memory region for the debuggee, the shared memory region remains allocated to the debugger and the debugger can continue to use the shared memory region without the risk of attempting to access deallocated memory.

Referring again to FIG. 1, although debuggee address manipulation application 115 is referred to as an application, this is illustrative only. Debuggee address manipulation application 115 should be capable of being called from an application or the operating system. In one embodiment, an application is generally defined to be any executable code. Moreover, those of skill in the art will understand that when it is said that an application or an operation takes some action, the action is the result of executing one or more instructions by a processor.

While embodiments in accordance with the present invention have been described for a client-server configuration, an embodiment of the present invention is carried out using any suitable hardware configuration or means involving a personal computer, a workstation, a portable device, or a network of computer devices. Other network configurations other than client-server configurations, e.g., peer-to-peer, web-based, intranet, and internet network configurations, are used in other embodiments.

Herein, a computer program product comprises a medium configured to store or transport computer readable code in accordance with an embodiment of the present invention. Some examples of computer program products are CD-ROM discs, DVDs, ROM cards, floppy discs, magnetic tapes, computer hard drives, servers on a network and signals transmitted over a network representing computer readable code.

As illustrated in FIG. 1, this medium belongs to the computer system itself. However, the medium is also removed from the computer system. For example, debuggee address manipulation application 115 is stored in memory that is physically located in a location different from processor 108, e.g., memory 136 of server system 130. Processor 108 should be coupled to the memory 136. This could be accomplished in a client-server system, or alternatively via a connection to another computer via modems and analog lines, or digital interfaces and a digital carrier line.

More specifically, in one embodiment, local computer system 104L and/or server system 130 is a portable computer, a workstation, a two-way pager, a cellular telephone, a digital wireless telephone, a personal digital assistant, a server computer, an Internet appliance, or any other device that includes components that execute debuggee address manipulation application 115 in accordance with at least one of the embodiments as described herein. Similarly, in another embodiment, local computer system 104L and/or server system 130 is comprised of multiple different computers, wireless devices, cellular telephones, digital telephones, two-way pagers, personal digital assistants, server computers, or any desired combination of these devices that are interconnected to perform the methods as described herein.

In view of this disclosure, debuggee address manipulation application 115 in accordance with one embodiment of the present invention can be implemented in a wide variety of computer system configurations. In addition, debuggee address manipulation application 115 could be stored as different modules in memories of different devices. For example, debuggee address manipulation application 115 could initially be stored in server system 130, and as necessary, a portion of debuggee address manipulation application 115 could be transferred to local computer system 104L and executed on local computer system 104L. Consequently, part of the debuggee address manipulation functionality would be executed on processor 134 of server system 130, and another part would be executed on processor 108 of local computer system 104L. In view of this disclosure, those of skill in the art can implement various embodiments of the present invention in a wide variety of physical hardware configurations using an operating system and computer programming language of interest to the user.

In yet another embodiment, debuggee address manipulation application 115 is stored in memory 136 of server system 130. Debuggee address manipulation application 115 is transferred over network 110 to memory 114L in local computer system 104L. In this embodiment, network interface 138 and I/O interface 109 would include analog modems, digital modems, or a network interface card. If modems are used, network 110 includes a communications network, and debuggee address manipulation application 115 is downloaded via the communications network.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A computer-implemented method comprising:
generating a list of all memory regions of a debuggee and injecting a thread into the debuggee, the injected thread for generating the list and communicating with the debugger, the memory regions comprising old debuggee shared memory regions and private memory regions;
adding old debuggee shared memory region handles to the list, each old debuggee shared memory region handle corresponding to an associated old debuggee shared memory region;
using the old debuggee shared memory region handles to map the associated old debuggee shared memory regions to a debugger, wherein for each given old debuggee shared memory region mapped to the debugger, a virtual address of the given mapped old debuggee shared memory region used by the debugger matches a virtual address of the given mapped old debuggee shared memory region used by the debuggee;
creating and mapping new debugger shared memory regions to the debugger, each new debugger shared memory region corresponding to an associated private memory region of the debuggee;
adding new debugger shared memory region handles to the list, each new debugger shared memory region handle corresponding to an associated new debugger shared memory region; and
using the new debugger shared memory region handles to map the associated new debugger shared memory regions to the debuggee;
wherein creating and mapping new debugger shared memory regions to the debugger comprises:
processing each private memory region in the list, the processing further comprising:
creating a new debugger shared memory region that matches the size of the private memory region of the debuggee;
transferring content of the private memory region of the debuggee to the new debugger shared memory region that matches the size of the private memory region of the debuggee; and
freeing the private memory region of the debuggee unless the private memory region is allocated for the injected thread; and
mapping the new debugger shared memory regions to respective virtual addresses of the debuggee corresponding to the respective freed private memory regions.

2. The computer-implemented method of claim 1, further comprising creating the debuggee in a suspended state.

3. The computer-implemented method of claim 1, further comprising suspending the debuggee.

4. The computer-implemented method of claim 1, further comprising:
upon the injecting a thread into the debuggee, having the debugger sleep until woken up by the injected thread.

5. The computer-implemented method of claim 4, further comprising:
awakening the debugger; and
having the injected thread sleep until woken up by the debugger.

6. The computer-implemented method of claim 1, further comprising reading and writing to the old debuggee shared memory regions and the new debugger shared memory regions.

7. A computer-implemented method comprising:
establishing communication with a debugger;
hooking an allocate virtual memory function and a free virtual memory function;
hooking a map shared memory region function and an unmap shared memory region function;
generating a list of all memory regions of a debuggee, the memory regions including old debuggee shared memory regions and private memory regions;
processing each memory region in the list to determine if the memory region is an old debuggee shared memory region;
upon a determination that the memory region is an old debuggee shared memory region, providing an old debuggee shared memory region handle for the old debuggee shared memory region;
storing the list;
receiving new debugger shared memory region handles, each new debugger shared memory region handle corresponding to an associated new debugger shared memory region, each new debugger shared memory region corresponding to an associated private memory region of the debuggee, wherein each new debugger shared memory region handle is created through a process comprising:
creating a new debugger shared memory region that matches the size of a given private memory region of the debuggee;
transferring content of the given private memory region of the debuggee to the new debugger shared memory region that matches the size of the private memory region of the debuggee; and
freeing the given private memory region of the debuggee unless the private memory region is allocated for the injected thread; and
mapping the new debugger shared memory region to a virtual address of the debuggee corresponding to a memory handle of the freed private memory region; and
using the new debugger shared memory region handles to map the associated new debugger shared memory regions to the debuggee.

8. The computer-implemented method of claim 7, further comprising:
suspending the debuggee.

9. The computer-implemented method of claim 8, further comprising:
un-suspending the suspended debuggee.

10. The computer-implemented method of claim 7, further comprising:
upon invocation of the map shared memory region function hook, appending a new debuggee shared memory region to the stored list;

providing a new debuggee shared memory region handle associated with the new debuggee shared memory region; and using the new debuggee shared memory region handle to map the new debuggee shared memory region to the debugger.

11. The computer-implemented method of claim 9, further comprising:

upon invocation of the unmap shared memory region function hook, determining a shared memory region being unmapped for the debuggee; and unmapping the shared memory region for the debugger.

12. The computer-implemented method of claim 9, further comprising:

upon invocation of the allocate virtual memory function hook, preventing an attempt to allocate a private memory region for the debuggee;

providing information about the private memory region attempted to be allocated;

based on the provided information, creating and mapping a new debugger shared memory region to the debugger;

providing a new debugger shared memory region handle for the new shared debugger memory region; and using the new debugger shared memory region handle to map the new debugger shared memory region to the debuggee.

13. The computer-implemented method of claim 7, further comprising:

upon invocation of the free virtual memory function hook, unmapping a shared memory region for the debuggee, the shared memory region corresponding to a private memory region attempted to be deallocated;

determining the shared memory region being unmapped for the debuggee;

unmapping the shared memory region for the debugger; and deallocating the shared memory region.

14. A computer-program product comprising a nontransitory computer readable medium containing computer program code comprising:

a debuggee address manipulation application for creating a debuggee in a suspended state;

the debuggee address manipulation application further for injecting a thread into the debuggee;

the debuggee address manipulation application further for establishing communication with a debugger;

the debuggee address manipulation application further for hooking an allocate virtual memory function, a free virtual memory function, a map shared memory region function and an unmap shared memory region function;

the debuggee address manipulation application further for generating a list of all memory regions for the debuggee, the memory regions comprising old debuggee shared memory regions and private memory regions;

the debuggee address manipulation application further for providing old debuggee shared memory region handles, each old debuggee shared memory region handle corresponding to an associated old debuggee shared memory region;

the debuggee address manipulation application further for using the old debuggee shared memory region handles to map the associated old debuggee shared memory regions to the debugger;

the debuggee address manipulation application further for creating and mapping new debugger shared memory regions, each new debugger shared memory region corresponding to an associated private memory region of the debuggee;

the debuggee address manipulation application further for transferring content of the private memory regions of the debuggee to the corresponding new debugger shared memory regions;

the debuggee address manipulation application further for freeing the private memory regions of the debuggee;

the debuggee address manipulation application further for providing new debugger shared memory region handles, each new debugger shared memory region handle corresponding to an associated new debugger shared memory region;

the debuggee address manipulation application further for using the new debugger shared memory region handles to map the new debugger shared memory regions to the debuggee;

the debuggee address manipulation application further for un-suspending the debuggee; and the debuggee address manipulation application further for reading and writing to the old debuggee shared memory regions and the new debugger shared memory regions;

wherein creating and mapping new debugger shared memory regions to the debugger comprises:

processing each private memory region in the list, the processing further comprising:

creating a new debugger shared memory region that matches the size of the private memory region of the debuggee;

transferring content of the private memory region of the debuggee to the new debugger shared memory region that matches the size of the private memory region of the debuggee; and freeing the private memory region of the debuggee unless the private memory region is allocated for the injected thread; and mapping the new debugger shared memory regions to respective virtual addresses of the debuggee corresponding to the respective freed private memory regions.

15. The computer-program product of claim 14, whereupon invocation of the map shared memory region function hook to create a new debuggee shared memory region, the debuggee address manipulation application is further for:

providing a new debuggee shared memory region handle; and using the new debuggee shared memory region handle to map the new debuggee shared memory region to the debugger.

16. The computer-program product of claim 14, whereupon invocation of the unmap shared memory region function hook to unmap a shared memory region for the debuggee, the debuggee address manipulation application is further for:

determining the shared memory region being unmapped; and unmapping the shared memory region for the debugger.

17. The computer-program product of claim 14, whereupon invocation of the allocate virtual memory function hook to allocate a private memory region for the debuggee, the debuggee address manipulation application is further for:

preventing the allocate virtual memory function from allocating the private memory region;

providing information about the private memory region;

based on the provided information, creating and mapping a new debugger shared memory region to the debugger;

providing a new debugger shared memory region handle for use of the new debugger shared memory region by the debuggee; and using the new debugger shared memory region handle to map the new debugger shared memory region to the debuggee.

18. The computer-program product of claim 14, whereupon invocation of the free virtual memory function hook to deallocate a private memory region of the debuggee, the debuggee address manipulation application is further for:

unmapping a shared memory region corresponding to the private memory region attempted to be deallocated;

determining the shared memory region being unmapped for the debuggee;

unmapping the shared memory region for the debugger; and deallocating the shared memory region.

* * * * *

UNITED STATES PATENT AND TRADEMARK OFFICE
CERTIFICATE OF CORRECTION

PATENT NO. : 7,975,260 B1  
APPLICATION NO. : 11/341048  
DATED : July 5, 2011  
INVENTOR(S) : Matthew Conover Page 1 of 1

It is certified that error appears in the above-identified patent and that said Letters Patent is hereby corrected as shown below:

In Column 21, Line 7, Claim 11, replace "claim 9" with --claim 7--; and
In Column 21, Line 13, Claim 12, replace "claim 9" with --claim 7--.

Signed and Sealed this
Eleventh Day of September, 2012

David J. Kappos
*Director of the United States Patent and Trademark Office*